United States Patent
Hou et al.

(10) Patent No.: US 12,527,439 B2
(45) Date of Patent: Jan. 20, 2026

(54) KITCHEN CONTAINER WITH BUILT-IN ROTATING MECHANISM

(71) Applicant: FREE-FREE INDUSTRIAL CORP, Taipei (TW)

(72) Inventors: Yi-Liang Hou, Taipei (TW); Che-Hsin Liao, Taipei (TW); Chen-Yu Cheng, Taipei (TW)

(73) Assignee: FREE-FREE INDUSTRIAL CORP, Taipei (TW)

( * ) Notice: Subject to any disclaimer, the term of this patent is extended or adjusted under 35 U.S.C. 154(b) by 936 days.

(21) Appl. No.: 17/698,793

(22) Filed: Mar. 18, 2022

(65) Prior Publication Data

US 2023/0292960 A1    Sep. 21, 2023

(51) Int. Cl.
*A47J 43/24*    (2006.01)
*A47J 43/044*    (2006.01)

(52) U.S. Cl.
CPC ............. *A47J 43/24* (2013.01); *A47J 43/044* (2013.01)

(58) Field of Classification Search
CPC ........ A47J 43/24; A47J 43/044; A47J 43/105; A47J 43/1018; A23N 12/086; F16H 19/04; F16H 19/043; F26B 5/08; Y10T 74/18128; B01F 2101/1805; B01F 33/5014

See application file for complete search history.

(56) References Cited

U.S. PATENT DOCUMENTS

| 6,622,618 B1 | 9/2003 | Glucksman et al. |
| 2008/0188365 A1* | 8/2008 | Dalla Piazza ........... F26B 11/02 74/29 |
| 2010/0263555 A1* | 10/2010 | Mah ....................... A47J 43/24 99/495 |

(Continued)

FOREIGN PATENT DOCUMENTS

| CN | 200954057 Y | 10/2007 |
| CN | 102133055 A | 7/2011 |

(Continued)

OTHER PUBLICATIONS

Search Report dated Jun. 29, 2022 of the corresponding PCT patent application No. PCT/CN2021/138871.

(Continued)

*Primary Examiner* — Steven W Crabb
*Assistant Examiner* — Allison E Helferty
(74) *Attorney, Agent, or Firm* — HDLS IPR SERVICES; Chun-Ming Shih (57) ABSTRACT

A kitchen container includes a container body, a cover body, a rotating mechanism, and a drive element. The rotating mechanism includes a moving rack transversely movable on the cover body, a main gear driven by the moving rack and a drive gear driven by the main gear. The drive element is connected with the drive gear. The main gear is linked with the drive gear through at least one transmission set. The transmission set is disposed on a sliding trough and is shifted with rotation of the main gear. The transmission set shifts on the sliding trough to be a linked state with the drive gear (Continued)

when the main gear rotates in a rotating direction, and the transmission set shifts on the sliding trough to be disengaged from the linked state with the drive gear when the main gear rotates in another rotating direction.

6 Claims, 6 Drawing Sheets

(56) References Cited

U.S. PATENT DOCUMENTS

| | | | |
|---|---|---|---|
| 2013/0180414 A1* | 7/2013 | Chan | F16H 19/04 74/34 |
| 2013/0334350 A1 | 12/2013 | Wong | |
| 2014/0261018 A1* | 9/2014 | Katz | A47J 43/24 99/495 |
| 2015/0075392 A1 | 3/2015 | So | |
| 2019/0224635 A1* | 7/2019 | Kent | A47J 43/06 |
| 2021/0282597 A1* | 9/2021 | Lin | A47J 43/044 |

FOREIGN PATENT DOCUMENTS

| | | | |
|---|---|---|---|
| CN | 205649407 U | | 10/2016 |
| CN | 207728824 U | * | 8/2018 |
| CN | 110805664 A | | 2/2020 |
| EP | 2120659 B1 | | 10/2010 |
| EP | 2682031 B1 | | 7/2017 |
| WO | 2015028914 A2 | | 3/2015 |

OTHER PUBLICATIONS

Office Action dated Oct. 18, 2024 of the corresponding Germany patent application No. 112021007774.0.
Office Action dated May 24, 2022 of the corresponding Taiwan patent application No. 110147690.

* cited by examiner

KITCHEN CONTAINER WITH BUILT-IN ROTATING MECHANISM

BACKGROUND

Technical Field

The disclosure relates to a kitchen gear, particularly to a kitchen container with a built-in rotating mechanism.

Related Art

With the ever-increasing living standards of human beings, people are more particular about diet. In ordinary life, using various utensils in a kitchen for cooking needs and help is one of the daily tasks of the homemakers nowadays. In order to facilitate stirring the food to be cooked, such as making salads or beating eggs, all kinds of tools can be used to quickly stir the ingredients. When cleaning fresh ingredients such as vegetables and fruits, the purpose of cleaning and dehydration can also be achieved through related tools.

In the related-art kitchen tools, for the mixing container or the drain basin used in the above steps, it is usually driven by rotating a center rod to rotate a stirring rod to rotate for stirring, or drives the drain basin to rotate for washing or dehydration with the centrifugal force generated by rotation. In driving the aforementioned rotation action, it is mainly provided with a crank that can be held by a human hand, and the aforementioned rotation effect is achieved by manually turning the crank. Others may use electric component as the main driving force. However, due to the prices or usage habits of market products, electric and manual products have been separated in the market. Therefore, although manual operation is more laborious than electric driving, in terms of price and usage habits, there is still a necessity for its existence.

However, through the aforementioned rotation method, a user's hand must exert force through wrist during operation, but the force is generally exerted by the elbow together with arm and may have a larger range of motion. At the same time, it also appears to be laborious in force.

In view of this, the inventors have devoted themselves to the above-mentioned related art, researched intensively and cooperated with the application of science to try to solve the above-mentioned problems. Finally, the invention which is reasonable and effective to overcome the above drawbacks is provided.

SUMMARY

An object of the disclosure is to provide a kitchen container with a built-in rotating mechanism, which may change the related-art operation manner of rotation or pressing into a unidirectional or bidirectional horizontal-shift operation manner to drive the gear set to rotate under the premise of manual operation. This further saves effort and reduces the action range of operation to achieve a new design of a manual product.

To accomplish the above object, the disclosure provides a kitchen container with a built-in rotating mechanism, which includes a container body, a cover body covering the container body, a rotating mechanism disposed on the cover body and a drive element. The rotating mechanism includes a moving rack transversely movable on the cover body, a main gear driven by the moving rack and a drive gear driven by the main gear. The drive element is connected with the drive gear. The main gear is linked with the drive gear through at least one transmission set. The transmission set is disposed on a sliding trough and is shifted with rotation of the main gear. The transmission set shifts on the sliding trough to be a linked state with the drive gear when the main gear rotates in a rotating direction, and the transmission set shifts on the sliding trough to be disengaged from the linked state with the drive gear when the main gear rotates in another rotating direction.

To accomplish the above object, the disclosure provides a kitchen container with a built-in rotating mechanism, which includes a container body, a cover body covering the container body, a rotating mechanism disposed on the cover body and a drive element. The rotating mechanism includes a moving rack transversely movable on the cover body, a main gear driven by the moving rack and a drive gear driven by the main gear. The drive element is connected with the drive gear. The main gear is linked with the drive gear through a first transmission set and a second transmission set. The first transmission set is slidably disposed on a first sliding trough and the second transmission set is slidably disposed on a second sliding. The first transmission set and the second transmission set are respectively shifted on the first sliding trough and the second sliding trough with rotation of the main gear. The first transmission set shifts on the first sliding trough to be a linked state with the drive gear when the main gear rotates in a rotating direction, and the first transmission set shifts on the first sliding trough to be disengaged from the linked state with the drive gear and the second transmission set shifts on the second sliding trough and engages with the drive gear to be another linked state when the main gear rotates in another rotating direction.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
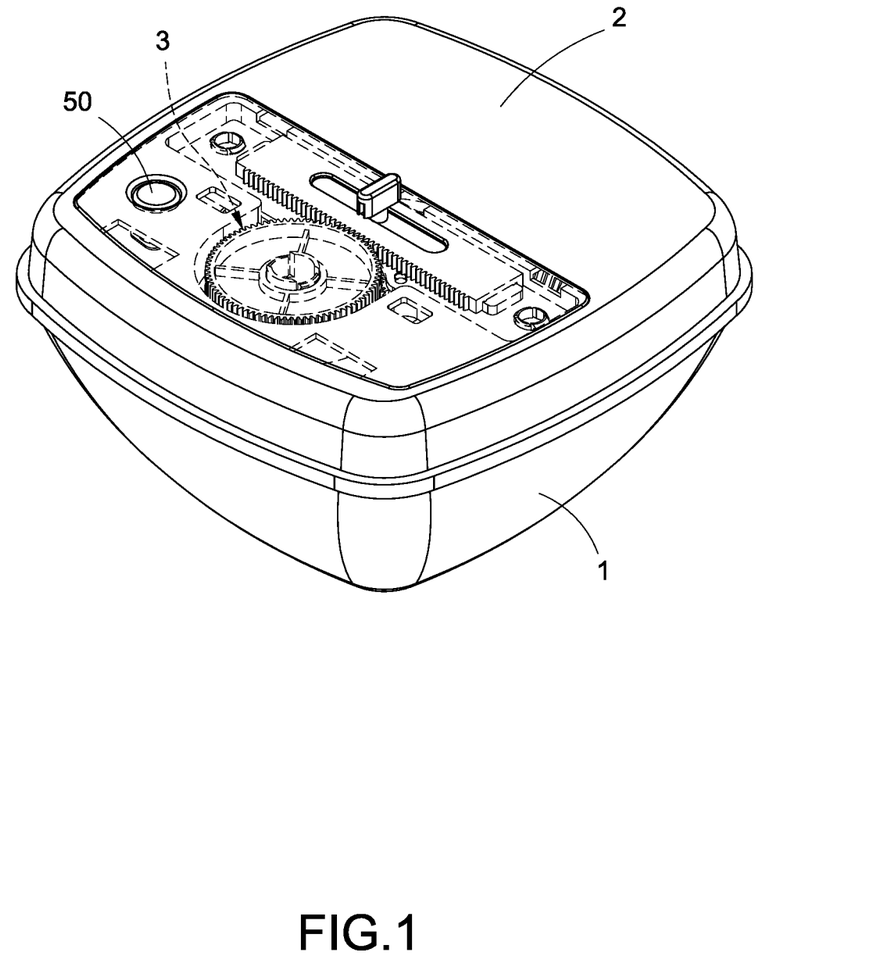
FIG. 1 is a perspective schematic view of the disclosure when the container body and the cover body are assembled.
Figure 2:
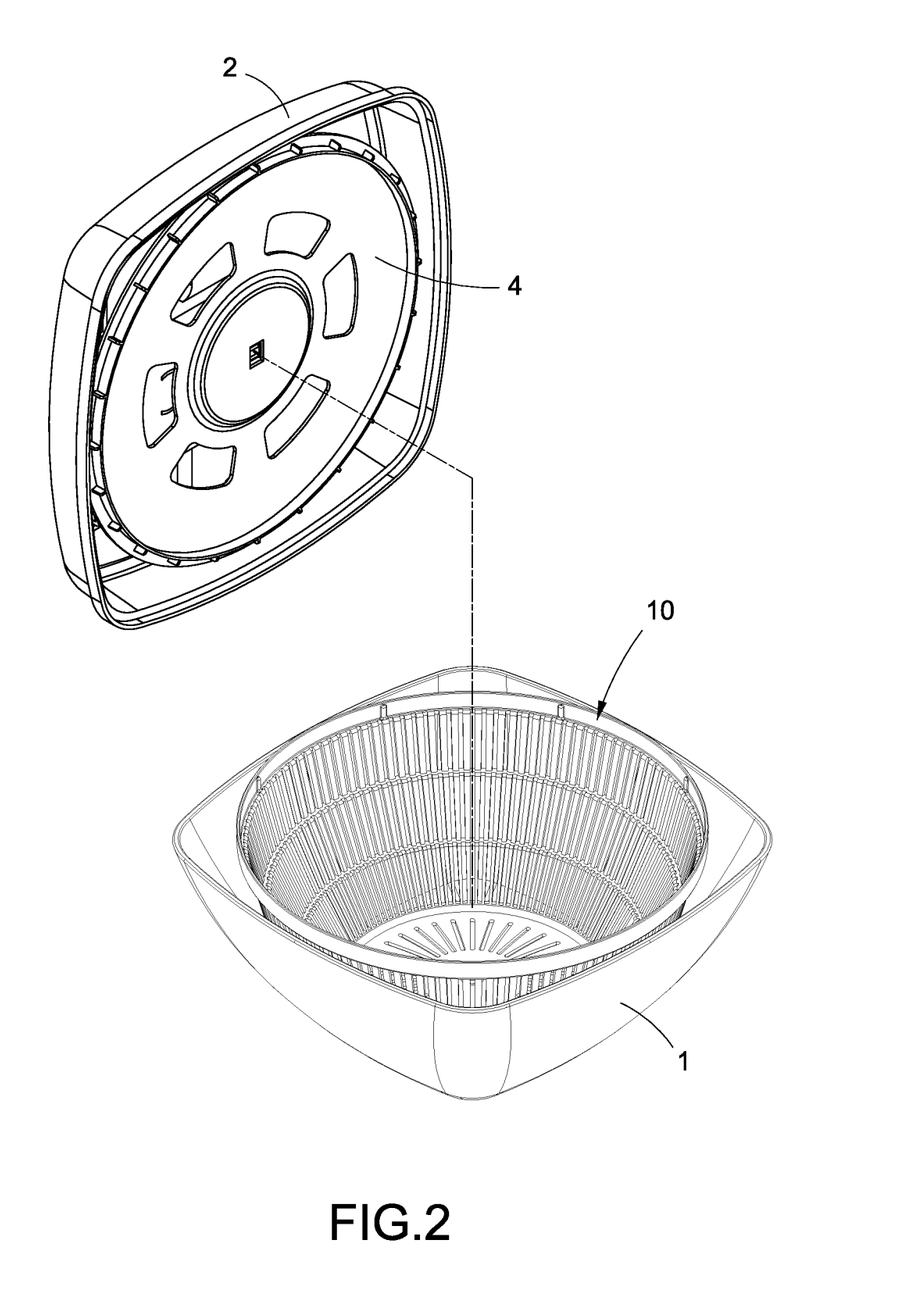
FIG. 2 is a perspective schematic view of the disclosure when the container body and the cover body are separated.

Please refer to FIGS. 1 and 2, which are a perspective schematic view of the disclosure when the container body and the cover body are assembled and a perspective schematic view of the disclosure when the container body and the cover body are separated. The disclosure provides a kitchen container with a built-in rotating mechanism, which includes a container body 1, a cover body 2 covering the container body 1, a rotating mechanism 3 disposed on the cover body 2 and a drive element 4 driven by the rotating mechanism 3 to rotate. The container body 1 may be used to hold vegetable or fruit to be washed, and the water washing the vegetable or fruit may be dehydrated by the centrifugal force exerted from rotation of the drain basin 10 placed in the container body 1, the drain basin 10 is rotated by the rotating mechanism 3 and the drive element 4. Other manner is also available (not shown), for example, the container body 1 is used to hold food to be stirred (such as salad or stirring eggs) and is rotated by the rotating mechanism 3 and the drive element 4, it is the drive element 4 to stir the food in the container body 1. In this embodiment, the shape of the drive element 4 may be changed to match using circumstances, for example, a stirring rod. However, this does not affect the rotation of the drive element 4 driven by the rotating mechanism 3 or other available manners of further driving the drain basin 10.

Figure 3:
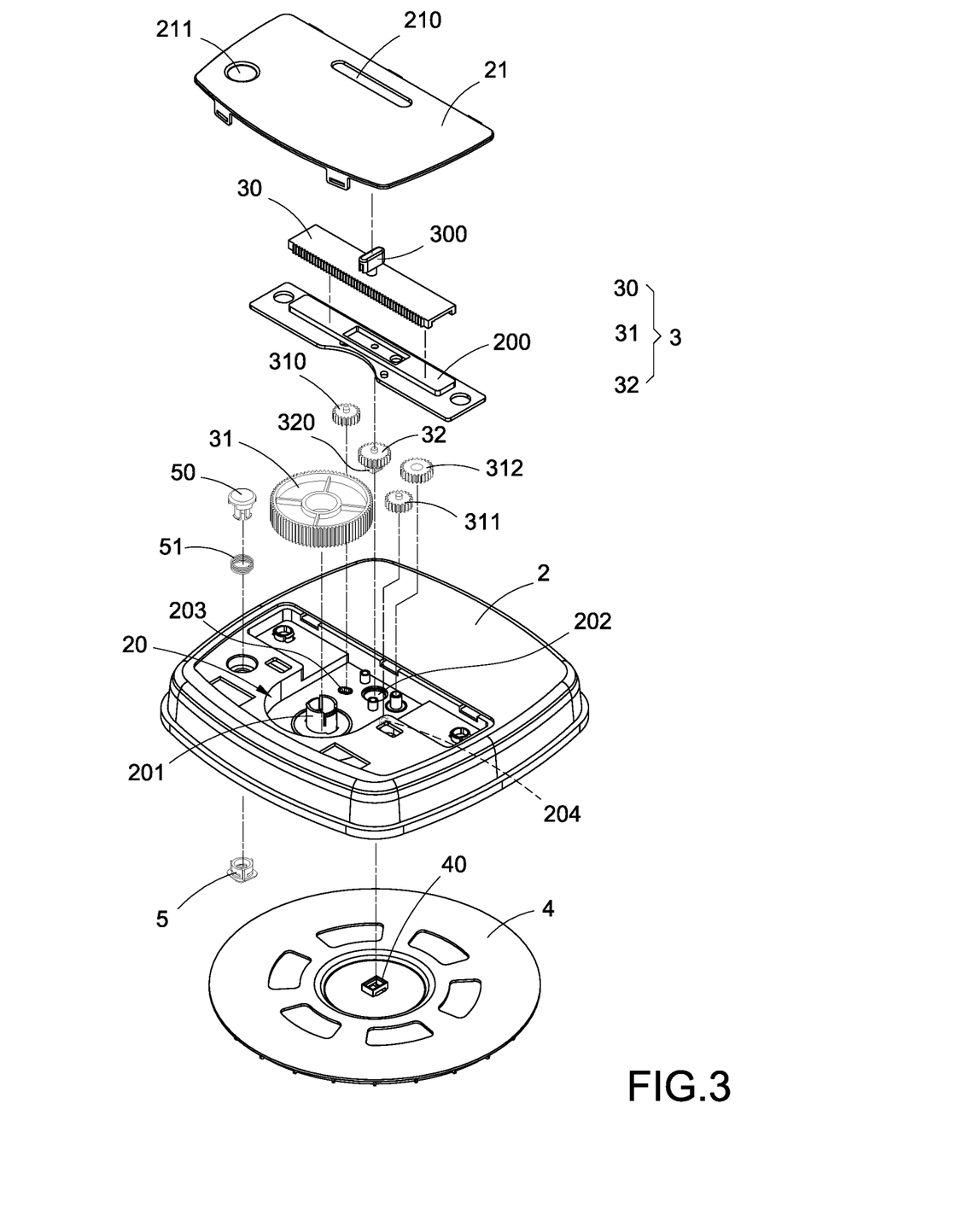
FIG. 3 is an explode view of the cover body, the rotating mechanism, and the drive element of the disclosure.
Figure 4:
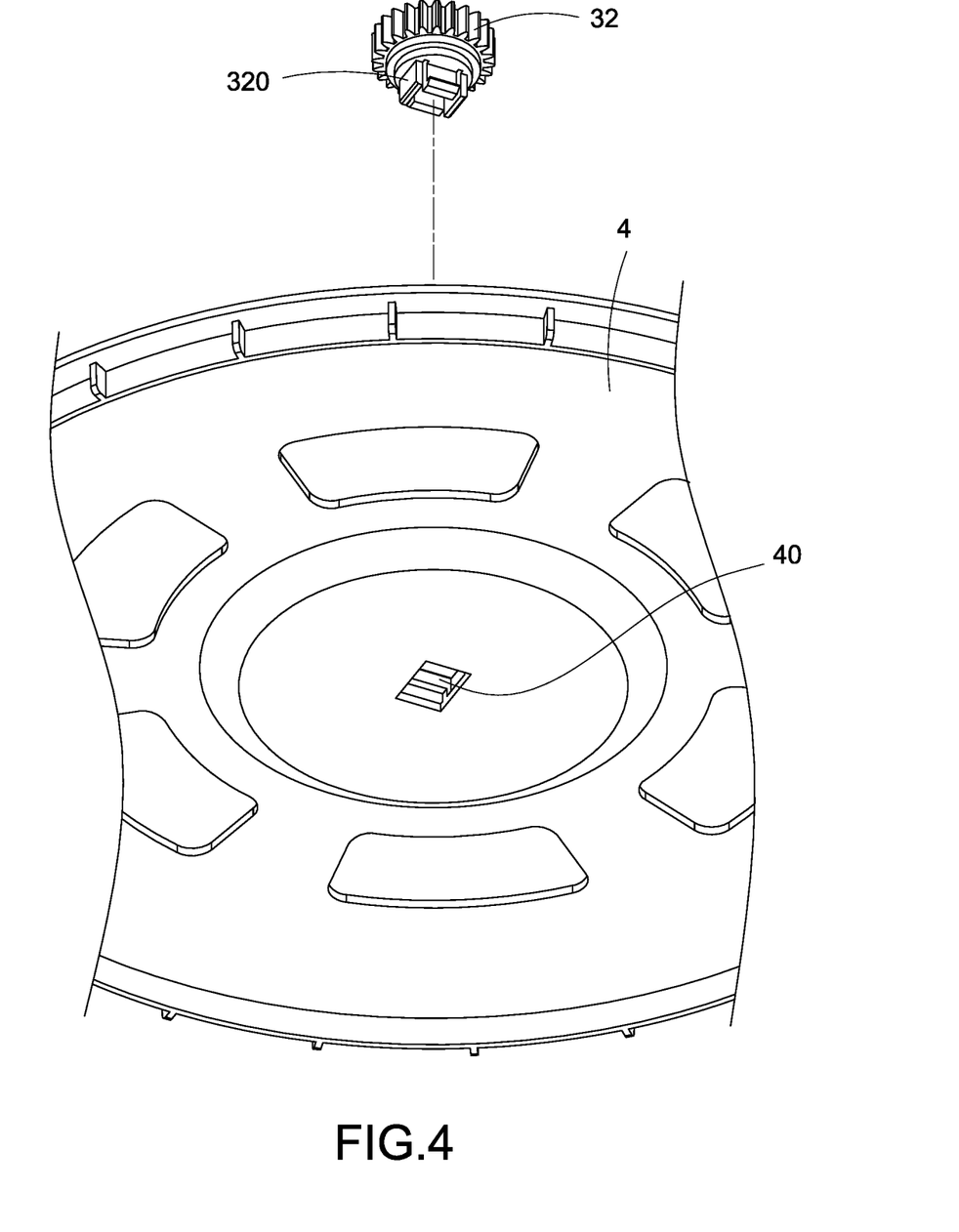
FIG. 4 is an explode view of the drive element and the drive gear of the disclosure.

As shown in FIG. 3, the rotating mechanism 3 is disposed on the cover body 2. The upper surface of the cover body 2 is concavely formed with a receiving room 20 for receiving the rotating mechanism 3 and is covered by a cover plate 21. The rotating mechanism 3 includes a moving rack 30, a main gear 31 driven by the moving rack 30 and a drive gear 32 driven by the main gear 31. The moving rack 30 transversely moves on the cover body 2 for directly or indirectly driving the main gear 31 to rotate. The moving rack 30 may be arranged on a transverse sliding seat 200 that is disposed in the receiving room 20. The main gear 31 separately links a first transmission set 310 and a second transmission set 311 depending on either one of two different directions (such as right or left) of the transverse shift of the moving rack 30. Each of the first and second transmission sets 310, 311 may be composed of a gear or multiple gears. In the shown embodiment of the disclosure, the first transmission set 310 is a single gear, and the second transmission set 311 further includes an idle gear 312. In addition, the receiving room 20 of the cover body 2 is provided with a shaft 201 for the main gear 31 to be disposed pivotally and a through hole 202 allowing the drive gear 32 to pass through for driving the drive element 4. The drive gear 32 may be pivotally disposed under the transverse sliding seat 200. Besides, as shown in FIG. 4, the bottom of the drive gear 32 may be provided with a connecting portion 320. The connecting portion 320 passes through the through hole 202 to be connected with the drive element 4. The drive element 4 is formed with a connecting hole 40 for the connecting portion 320 to be connected, but this connection is not limited to this, any other connection manners for the drive gear 32 to be rotatable and further driving the drive element 4 are acceptable for the disclosure.

Figure 5:
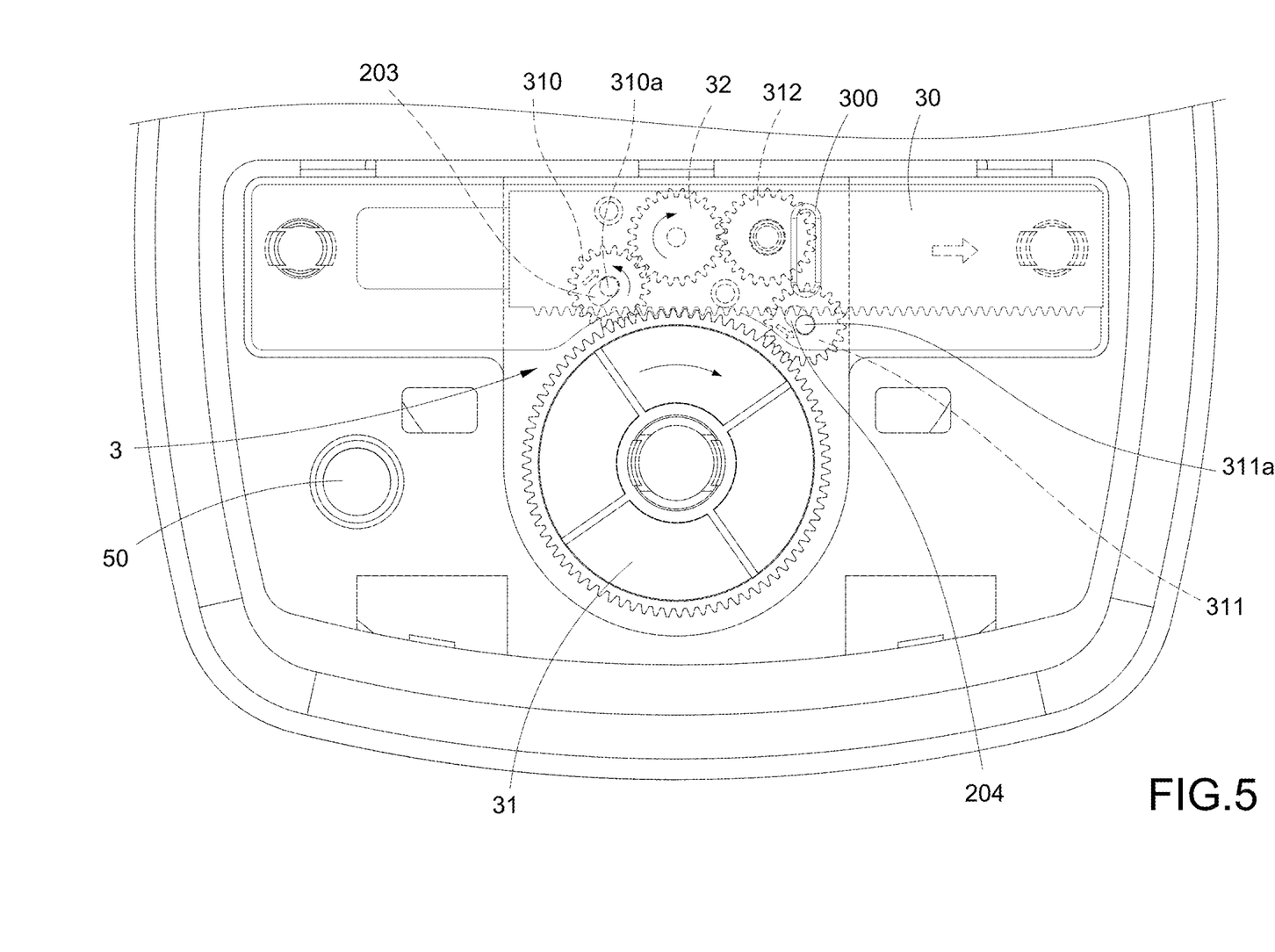
FIG. 5 is a schematic view of the disclosure which is operated to move toward a direction.
Figure 6:
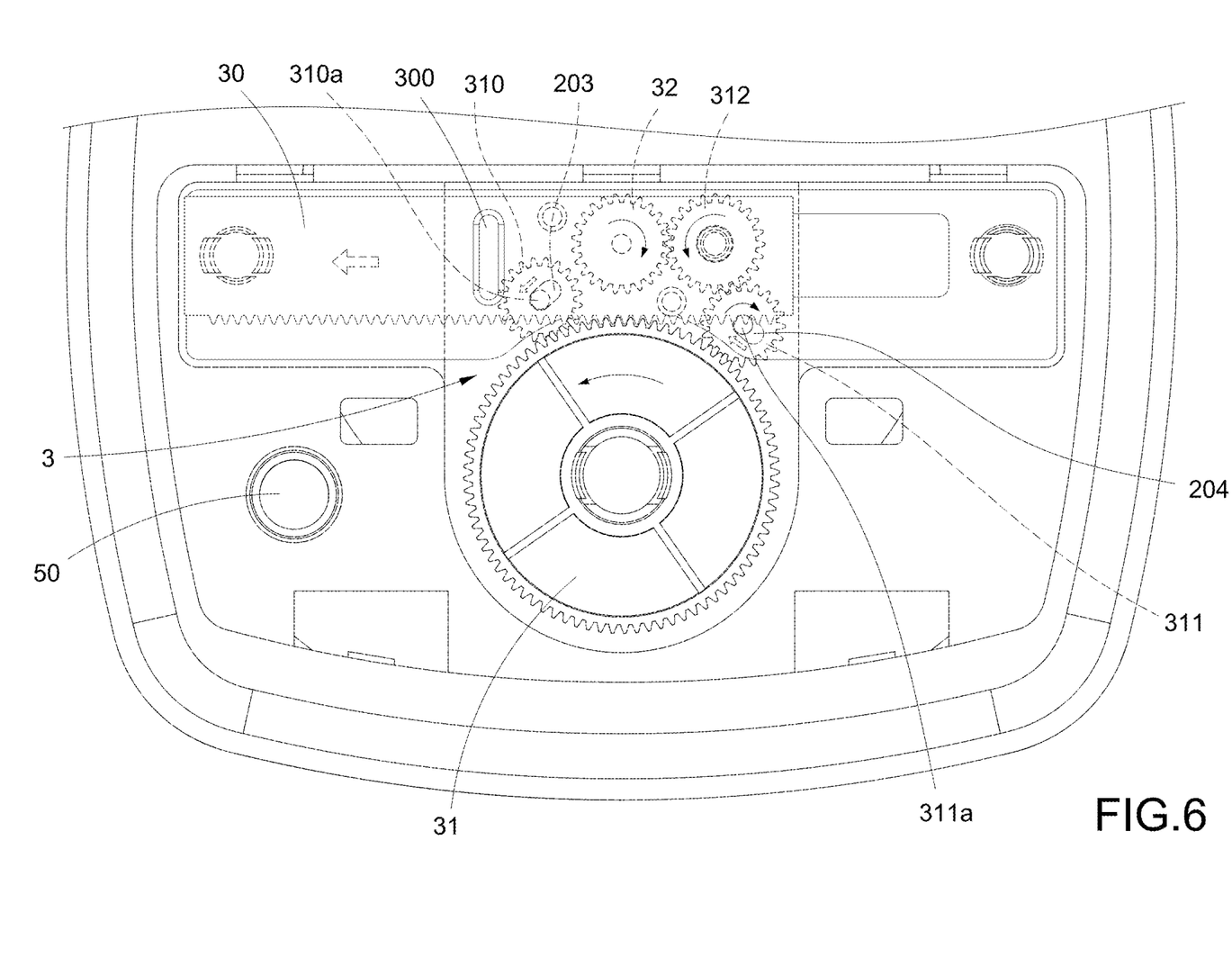
FIG. 6 is a schematic view of the disclosure which is operated to move toward another direction.

Please refer to FIGS. 3, 5 and 6. The pivots 310a, 311a of the first transmission set 310 and the second transmission set 311 are slidably disposed in a first sliding trough 203 and a second sliding trough 204 for shifting, respectively, to separately push the first and second transmission sets 310, 311 to shift in the respective sliding troughs 203, 204 by different rotating directions of the main gear 31. Thus, the shift may be used to adjust engagement or disengagement of each one (of the first transmission set 310 and the second transmission set 311) and the drive gear 32 to achieve the object of making the drive gear 32 drive the drive element 4 or even link with the drain basin 10 to rotate.

Besides, in the shown embodiment of the disclosure, the drive element 4 is embodied by a turntable, but may also be the abovementioned stirring rod (not shown). In the embodiment using a turntable as an example, a periphery of the drive element 4 used as a turntable as shown in FIG. 2 may be connected with a periphery of the opening of the drain basin 10. Furthermore, as shown in FIG. 3, for the sake of operational convenience, the moving rack 30 may be provided with a grip 300, and the cover plate 21 is formed with an operation slot 210 so as to make the grip 300 protrude from the operation slot 210 for manual operation. The bottom of the cover body 2 may be added with a brake pad 5. The brake pad 5 may downward abut against the drive element 4 (such as an upper surface of the drive element 4) through a button 50 passing through the cover body 2. The brake pad 5 may provide friction to the drive element 4 used as a turntable to stop it. The inside of the button 50 may be additionally disposed with an elastic member 51 for restoration after being pressed. The cover plate 21 may be disposed with a button hole 211 for exposing the button 50.

Therefore, by the abovementioned structure, the kitchen container with a built-in rotating mechanism of the disclosure may be obtained.

As a result, when operating the disclosure, a user moves the grip 300 toward a side of the transverse sliding seat 200 or the operation slot 210 (the right direction in the figure). As shown in FIG. 5, when the moving rack 30 is shifted toward a direction by the operated grip 300, the main gear 31 may be rotated (clockwise in the figure) to make the main gear 31 push the first and second transmission sets 310, 311 to shift toward the same direction in the respective first and second sliding troughs 203, 204. At the same time, the first transmission set 310 engages with the drive gear 32 by the shifting to form a linked state, and the second transmission set 311 separates from the drive gear 32 by the shifting or disengages with the idle gear 312 to be released from the linked state with the drive gear 32. That is, the first transmission set 310 offers a linked relation which rotates the drive gear 32.

As shown in FIG. 6, when a user moves the grip 300 toward the other side of the transverse sliding seat 200 or the operation slot 210 (the left direction in the figure), the main gear 31 is reversely rotated (counterclockwise in the figure), but the main gear 31 pushes the first and second transmission sets 310, 311 to shift toward the other direction in the respective first and second sliding troughs 203, 204. In other words, the second transmission set 311 engages with the drive gear 32 by the shifting to form a linked state or engages with the idle gear 312 to form the linked state with the drive gear 32, and the first transmission set 310 separates from the drive gear 32 by the shifting. That is, the second transmission set 311 offers a linked relation which rotates the drive gear 32. Meanwhile, the idle gear 312 may be added to control the rotating direction depending on if the rotating direction of the drive gear 32 is consistent.

Accordingly, the disclosure utilizes the rotating mechanism 3 to unidirectionally or bidirectionally move the moving rack 30. This further saves effort and reduces the action range of operation to provide a new design of a manual product under the premise of manual operation.

While this disclosure has been described by means of specific embodiments, numerous modifications and variations could be made thereto by those skilled in the art without departing from the scope and spirit of this disclosure set forth in the claims.

What is claimed is:

1. A kitchen container comprising:
   a container body;
   a cover body, covering the container body;
   a rotating mechanism, disposed on the cover body, and comprising a moving rack transversely movable on the cover body, a main gear driven by the moving rack and a drive gear driven by the main gear; and
   a drive element, connected with the drive gear;
   wherein the main gear separately is linked with the drive gear through a first transmission set and a second transmission set, the first transmission set is slidably disposed on a first sliding trough, the second transmission set is slidably disposed on a second sliding trough, the first transmission set and the second transmission set are configured to respectively shift on the first sliding trough and the second sliding trough with rotation of the main gear, when the main gear is configured to rotate in one rotating direction, the first transmission set is configured to contact with the main gear to be brought by the main gear to shift on the first sliding trough to be one linked state with the drive gear, the first transmission set is configured to rotate in another rotating direction, and when the main gear is configured to rotate in the other rotating direction, the first transmission set is configured to still contact with the main gear to be brought by the main gear to shift on the first sliding trough to be disengaged from the linked state with the drive gear and the second transmission set is configured to contact with the main gear to be brought by the main gear to shift on the second sliding trough and engage with the drive gear to be another linked state, and a gear of the second transmission set contacting with the main gear is configured to rotate in the rotating direction;

wherein the container body comprises a drain basin connected with the drive element;

wherein the drive element comprises a turntable with a periphery connected with a periphery of an opening of the drain basin.

2. The kitchen container of claim 1, wherein a brake pad is disposed on a bottom of the cover body, the brake pad is configured to downward abut against the drive element through a button passing through the cover body.

3. The kitchen container of claim 1, wherein a receiving room is concavely defined on an upper surface of the cover body, the rotating mechanism is disposed in the receiving room, and the receiving room is covered by a cover plate.

4. The kitchen container of claim 3, wherein the moving rack is arranged on a transverse sliding seat, and the transverse sliding seat is disposed in the receiving room.

5. The kitchen container of claim 3, wherein the moving rack comprises a grip, an operation slot is defined on the cover plate, and the grip protrudes from the operation slot.

6. The kitchen container of claim 1, wherein the drive element comprises a stirring rod.

* * * * *